(12) United States Patent
Kozyuk et al.

(10) Patent No.: US 9,845,244 B2
(45) Date of Patent: Dec. 19, 2017

(54) METHOD OF FORMING GRAPHENE MATERIAL BY GRAPHITE EXFOLIATION

(71) Applicant: ARISDYNE SYSTEMS, INC., Cleveland, OH (US)

(72) Inventors: Oleg Kozyuk, North Ridgeville, OH (US); Peter Reimers, Shaker Heights, OH (US)

(73) Assignee: ARISDYNE SYSTEMS, INC., Cleveland, OH (US)

( * ) Notice: Subject to any disclaimer, the term of this patent is extended or adjusted under 35 U.S.C. 154(b) by 0 days.

(21) Appl. No.: 15/254,569

(22) Filed: Sep. 1, 2016

(65) Prior Publication Data

US 2017/0081191 A1    Mar. 23, 2017

Related U.S. Application Data

(60) Provisional application No. 62/219,903, filed on Sep. 17, 2015.

(51) Int. Cl.
| | |
|---|---|
| *C01B 31/04* | (2006.01) |
| *B01J 3/06* | (2006.01) |
| *B01J 4/00* | (2006.01) |
| *B01J 3/08* | (2006.01) |
| *C01B 32/184* | (2017.01) |

(52) U.S. Cl.
CPC .......... *C01B 31/0446* (2013.01); *B01J 3/062* (2013.01); *B01J 3/08* (2013.01); *B01J 4/002* (2013.01); *C01B 32/184* (2017.08); *B01J 2203/061* (2013.01); *B01J 2203/0625* (2013.01)

(58) Field of Classification Search
CPC . C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32
USPC ........................................................ 423/448
See application file for complete search history.

(56) References Cited

U.S. PATENT DOCUMENTS

| | | |
|---|---|---|
| 2,817,500 A | 12/1957 | Robinson |
| 3,545,492 A | 12/1970 | Scheid, Jr. |
| 3,763,886 A | 10/1973 | Lambert |
| 3,954,124 A | 5/1976 | Self |
| 4,249,574 A | 2/1981 | Schnall et al. |

(Continued)

FOREIGN PATENT DOCUMENTS

WO    2009132171 A1    10/2009

OTHER PUBLICATIONS

Shen, et al., Preparation of graphene by jet cavitation, Nanotechnology 2011; 22: 365306, pp. 1-7.*

(Continued)

*Primary Examiner* — Daniel C McCracken
(74) *Attorney, Agent, or Firm* — Pearne & Gordon LLP

(57) ABSTRACT

A method of producing graphene sheets and plates from graphitic material including (a) mixing graphitic material particles in a liquid medium to form a suspension; (b) compressing the suspension; (c) directing the compressed suspension through a local constriction into an area of reduced pressure to decompress the suspension in less than $2 \times 10^{-6}$ second to a pressure less than 20% of the compression pressure, thereby exfoliating graphene sheets and plates from the graphitic material.

14 Claims, 2 Drawing Sheets

(56) References Cited

U.S. PATENT DOCUMENTS

| | | | |
|---|---|---|---|
| 4,333,729 | A | 6/1982 | Marugg |
| 4,431,028 | A | 2/1984 | Hendrick |
| 4,567,915 | A | 2/1986 | Bates et al. |
| 4,715,395 | A | 12/1987 | Mainelli et al. |
| 5,327,941 | A | 7/1994 | Bitsakis et al. |
| 6,039,076 | A | 3/2000 | Hemme et al. |
| 7,824,651 | B2 | 11/2010 | Zhamu et al. |
| 2010/0022422 | A1 | 1/2010 | Wu et al. |
| 2010/0044646 | A1 | 2/2010 | Zhamu et al. |
| 2015/0239741 | A1 | 8/2015 | Burton et al. |

OTHER PUBLICATIONS

Coleman, Jonathan N., "Liquid Exfoliation of Defect-Free Graphene." Accounts of Chemical Research, 46.1, 2012, pp. 14-22.
Shen, Z. et al., "Preparation of Graphene by Jet Cavitation." Nanotechnology 22, Sep. 2011, 365306, pp. 1-7.
The International Search Report and Written Opinion issued in corresponding International Application No. PCT/US2016/049925; dated Dec. 15, 2016.

\* cited by examiner

METHOD OF FORMING GRAPHENE MATERIAL BY GRAPHITE EXFOLIATION

FIELD OF THE INVENTION

The invention provides a method of producing graphene material from a starting graphitic material.

DESCRIPTION OF RELATED ART

Graphene is a 2D nano-material produced by scientists. It is processed from graphite, a material that is abundant on the earth, and has a wide range of applications. Graphene can be implemented in the creation of potentially ultra-light and resistant composite materials, with the potential to replace steel in some applications. Graphene also has excellent electrical and thermal conductive properties, has a high elasticity and is virtually impermeable to all molecules. There is significant potential for graphene to be used in high speed electronics, optic circuits, photovoltaic cells, biosensors, and in developing more sophisticated catalyzing and filtering solutions for the chemical industry.

Currently there are two different methods for producing graphene, namely bottom up and top down methods. The bottom up method uses chemistry to assemble carbon atoms in order to create the monolayer structure. The main technique used in this process is chemical vapor deposition (CVD), which allows you to produce a monolayer of graphene directly onto a copper or nickel substrate.

The top down method refers to the exfoliation of graphite into graphene. Graphite is composed of millions of monolayers of graphene stuck together. This method attempts to break all the stacked layers of graphite to produce graphene mono-layers. The top down method essential includes starting with a big element and finishing with a small element. This was first achieved using sticky tape. The sticky tape was used to exfoliate graphite until a single layer of graphene was obtained.

To date, exfoliation is still the best technique for producing a defect-less mono-layer of graphene. This technique is still used in academic research in order to create, evolve and study graphene. However, this method is not suitable for the large scale production runs.

In this regard, the production of graphene by using ultrasonic cavitation to produce thin sheets of graphene via top down has recently been discovered by researchers. Most notable is the liquid phase exfoliation method, which was developed in Dublin by Coleman (Coleman, Jonathan N, "Liquid exfoliation of defect-free graphene." Accounts of Chemical Research 46.1 (2012): 14-22). The graphene was obtained by putting graphite into a solvent which was then shook vigorously using sonication points. This results in graphite exfoliating spontaneously into the solvent. This method is used to obtain graphene ink, graphene paint, graphene solution and if the solvent is evaporated—graphene powder.

As it stands, this technique only allows for production of grams of graphene, which is not an efficient amount for use in industry projects or composite materials. For this reason, a lot of investment has been made into research to facilitate higher levels of production of graphene.

Another technique to exfoliate graphite was also developed at the University of Manchester. The method is based on the electrochemical exfoliation of graphite using an electric current under specific conditions. This method of production has great potential in producing high quality graphene in the form of a powder solution or an ink. Morgan Advanced Materials has partnered with the university in developing and upscaling the process for generating kilograms of graphene per day.

In U.S. Pat. No. 7,824,651, graphite is directly placed in a solution containing a dispersing agent to obtain a suspension, and the suspension is exposed to ultrasonic waves at an energy level of greater than 80 watts to exfoliate graphite into a monolayer graphene with a thickness smaller than 10 nm. However, it takes a long time to obtain the desired size of graphene by mechanical force, which causes the increase of the energy consumption, costs and production time.

In U.S. Pub. No. 2010/0022422 a method for wet milling of graphite using solvents and dispersants is described. The dispersant may contain a lipophilic hydrocarbon group and a polar hydrophilic group. It method typically uses dispersants used in the automotive industry, which are to be used universally for the production of carbon nanotubes, graphite flakes, carbon fibers and carbon particles.

Recently Shen, et al (Zhigang Shen, Jinzhi Li, Min Yi, Xiaojing Zhang and Shulin Ma. "Preparation of graphene by jet cavitation." Nanotechnology 22 (2011) 365306 (7 pp) has demonstrated the feasibility of preparing graphene in liquid phase with a water solvent by jet cavitation, which is green, low cost, laborsaving, timesaving and insensitive to the environment. The graphene yield by this method is estimated at about 4 wt %.

Conventional methods for graphitic material exfoliation have yields that are generally less than 5%. This means 95% of the graphite starting material remains unexfoliated, and only 5% or less of the starting material is recovered as graphene material or flakes, each comprising one or a few layers of graphene. A problem with such low-yield methods is that they require multiple steps to generate sufficient amounts of graphene product for further processing. Thus, there is a need for a high-yield method of graphene production.

SUMMARY OF THE INVENTION

A method of producing a graphene material from graphitic material particles, the method comprising the steps of:
(a) mixing the graphitic material particles in a liquid medium to form a graphite suspension; and
(b) exposing said graphite suspension to a compression and explosive decompression treatment, the treatment comprising compressing the graphite suspension to a first pressure, directing the compressed graphite suspension at least once through a local constriction into an area of reduced pressure whereby the graphite suspension is decompressed from the first pressure to a second pressure, thereby expanding the graphitic material particles and exfoliating graphene material from the graphitic material particles to produce graphene material dispersed in said liquid medium.

DETAILED DESCRIPTION OF PREFERRED EMBODIMENTS OF THE INVENTION

Figure 1:
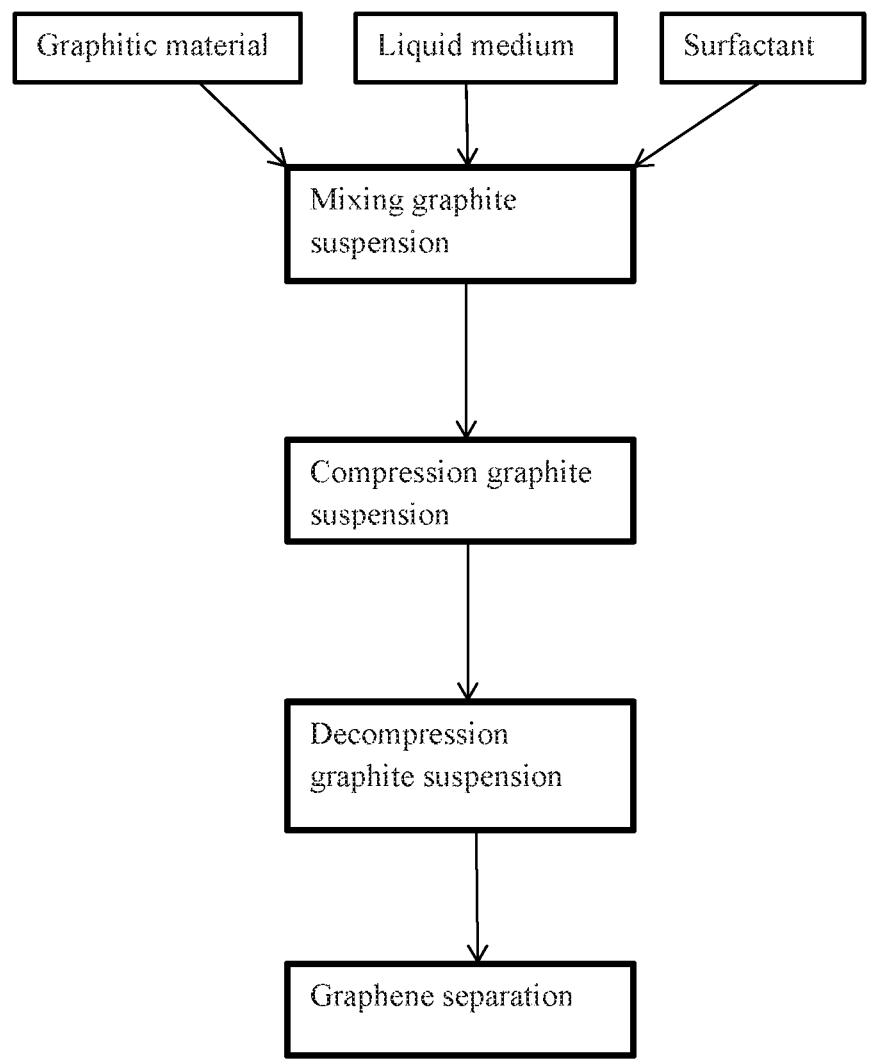
FIG. 1 is a block diagram depicting an example method of producing a graphene material from starting graphitic material particles.

As used herein, when a range such as 5 to 25 (or 5-25) is given, this means preferably at least 5, and separately and independently, preferably not more than 25. As used herein and in the claims, a monolayer of graphene is a graphene sheet; a plurality of graphene sheets stacked and bonded together is a graphene plate; graphene material means graphene sheets, graphene plates, or a mixture thereof.

Carbon materials can have an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber.

In one embodiment of the present disclosure is a method of producing a graphene material that is essentially composed of a sheet of graphene or multiple sheets of graphene stacked and bonded together (i.e., a graphene plate). Each graphene sheet, also referred to as a graphene plane or basal plane, comprises a two-dimensional hexagonal structure of carbon atoms. Each graphene sheet or plate has a length and a width parallel to the graphene plane and a thickness orthogonal to the graphene plane. The thickness of a graphene plate is typically 100 nanometers (nm) or smaller and more typically thinner than 10 nm with a single sheet of graphene being about 0.34 nm thick. The length and width of a graphene plate or sheet is typically between 1 μm and 30 μm, but could be longer or shorter. For certain applications, both length and width are smaller than 1 μm. In addition to graphite, graphite oxide and graphite fluoride are further examples of laminar or layered materials that can be exfoliated by using the methods described herein.

The present method is a green approach whereby graphitic material particles can be exfoliated into graphene material in an aqueous solution by exposing a graphite suspension to a compression and explosive decompression treatment as described below. Explosive decompression is meant as the rapid removal of pressure from the pressurized liquid medium or carrier within an elapsed time in the range of milliseconds or microseconds.

When the highly compressed graphite suspension experiences reduced pressure in the range of microseconds the graphite particles expand in the c-axis direction, perpendicular to the graphene or basal plane, causing exfoliation. This is possible mainly because the tensile stress caused by the graphite-solution interfacial reflection of compression and decompression waves acts as an intensive 'suction disk' on the graphene sheets and plates. The energy imparted to the suspension by the compression and decompression wave is more than sufficient to overcome the van der Waals forces between graphene sheets/plates within a graphite particle, thereby exfoliating graphene sheets and plates.

The compression and explosive decompression treatment also enables the resulting graphene sheets and plates to be well dispersed in the liquid medium, producing a homogeneous suspension. One major advantage of this approach is that exfoliation, separation, and dispersion are achieved in a single step. A monomer, oligomer, or polymer may be dissolved in, dispersed in or added to the graphite suspension or the liquid medium to form a nanocomposite precursor suspension that is a precursor to a nanocomposite structure.

As illustrated in the block diagram of FIG. 1, the disclosure generally is directed to a method of producing a graphene material from a starting graphitic material.

The invented method can comprise the following stages:

In a first stage particles (e.g., 10-600 or 25-500 or 80-300, microns) of the graphitic material are mixed with a liquid medium to form a graphite suspension or a suspension of graphitic material particles; for example, 0.1-3 or 0.5-2 or about 1, weight percent graphitic material particles with the balance being liquid medium.

In a second stage the graphite suspension is exposed to a compression and explosive decompression treatment in which the graphite suspension is compressed or pressurized, such as by use of a pressure intensifier or a pump (both shown as 28 in FIG. 2), to a level equal to at least 1,000 PSI to form a compressed graphite suspension. More preferable, the graphite suspension can be compressed or pressurized to at least 2000, 3000, 4000, 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 45000, 50000, 55000, 60000 PSI or more.

In a third stage explosive decompression of the compressed graphite suspension is achieved by directing it at least once through one or a multiplicity of constrictions or local constrictions into an area of reduced pressure (such as area 30 in FIG. 2) whereby the graphite suspension is decompressed from its compressed pressure to a pressure equal to or less than 20% (more preferably equal to or less than 15, 10, 9, 8, 7, 6, 5, 4, 3, 2 or 1%) of the compression pressure in a time period of less than $2 \times 10^{-6}$ second: the reduced pressure thereby expands the graphitic material particles and exfoliates graphene sheets and/or plates from the starting graphitic material.

It has been found that the graphite suspension has to be exposed to compression and explosive decompression steps in repeated cycles to achieve higher yields of graphene material. The graphite suspension can be exposed to the compression and explosive decompression steps at least 5, 10, 20, 30, 40, 50, 70, 90, 100, 150, 200, 300, 400, 500 times or more, such as in a series of throttle devices or via repetition cycles or recirculation steps.

In preferred embodiments of the invention, the pressure or static pressure in the area of reduced pressure is maintained above the saturated vapor pressure of the liquid medium sufficient to prevent formation of cavitation bubbles, such as hydrodynamic cavitation bubbles, the collapse of which can damage exfoliated graphene sheets and plates.

The graphitic material particles can be natural graphite, synthetic graphite, highly oriented pyrolytic graphite, mesocarbon micro-bead, coke, graphitized meso-phase carbon, graphitized soft carbon, carbon or graphite fiber or whisker, carbon or graphitic nano-fiber, exfoliated graphite, expanded graphite, or a combination thereof. The liquid medium for use in the invention can include water, organic solvent, alcohol, acid, a monomer, an oligomer, a resin, or a combination thereof. The liquid medium also can contain a surfactant selected from the group consisting of anionic surfactants, nonionic surfactants, cationic surfactants, amphoteric surfactants, silicone surfactants, fluoro-surfactants, polymeric surfactants, sodium hexametaphosphate, sodium lignosulphonate, poly(sodium 4-styrene sulfonate), sodium dodecylsulfate, sodium sulfate, sodium phosphate, sodium sulfonate, and combinations thereof. The temperature of the graphite suspension can be about 20-30 or 20-50 or 20-100 or 20-200 or 20-340, ° C. and higher.

Figure 2:
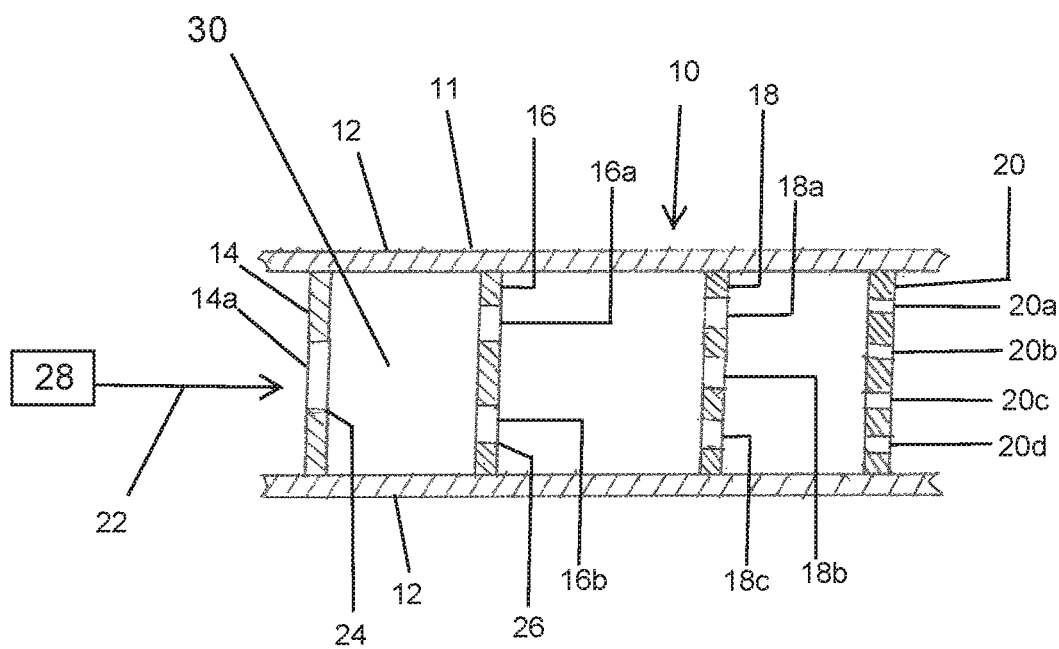
FIG. 2 is a schematic longitudinal section view of a portion of a throttle device.

The explosive decompression treatment can be carried out by use of (directing the graphite suspension through) a throttle device having at least one orifice, aperture, nozzle or pressure loss fluid control valve or device. Each orifice, aperture or nozzle (such as the orifices or apertures 14a, 16a-b, 18a-c, 20a-d in FIG. 2) is preferably cylindrical having a diameter, or diameter at the exit thereof, of not more than 3 mm, preferably less than 2, 1, 0.5, 0.3, 0.2, 0.15 or 0.1, mm. FIG. 2 shows an example of a throttle device 10, comprising a tube 11 defined by a cylindrical wall 12. The tube 11 has local constrictions (or circular plates with apertures) 14, 16, 18, 20, which block liquid flow in direction 22 except that orifices, nozzles, openings or apertures 14a, 16a, 16b, 18a, 18b, 18c, 20a, 20b, 20c, 20d permit liquid flow through the local constrictions and thus through tube 11. Area 30 is an area of reduced pressure. The throttle device can have 1, 2, 3, 4, 5, 6, 7, 8, 9, 10 or more local constrictions or plates with apertures; each local constriction, such as local constriction 14, can have 1, 2, 3, 4, 5, 6, 7, 8, 9, 10 or more orifices or apertures, preferably arranged symmetrically. The apertures in adjacent local constrictions or plates can be lined-up so liquid can flow through the apertures in adjacent plates in a direction parallel to the longitudinal axis of the device, or, more preferably, not lined up (as in throttle device 10). Preferably the orifices, nozzles or apertures have a sharp or square or 90° edge at the exit thereof, such as at exit edges 24, 26, for more efficient performance of the explosive decompression step(s). The throttle device can comprise one or a plurality of throttle devices (such as device 10) in series or in parallel. The throttle device can comprise non-adjustable, such as shown in FIG. 2, or adjustable.

A wide variety of throttle devices can be used to perform the explosive decompression step. For example, the throttle devices for throttling a fluid flow disclosed in U.S. Pat. Nos. 3,545,492; 3,763,886; 4,715,395; and 5,327,941 can be used, which are non-adjustable throttle devices; the throttle devices or pressure loss fluid control devices disclosed in U.S. Pat. Nos. 2,817,500; 3,954,124; 4,249,574; 4,333,729; 4,431,028; 4,567,915; and 6,039,076 can be used as adjustable throttle devices; the contents and drawings of all these patents are incorporated herein by reference.

In order to promote a further understanding of the present disclosure, the following examples are provided in Table 1. These examples are shown by way of illustration and not limitation. A 1,000 g graphitic material particle-water suspension comprising 1.0 wt % natural flake graphite sized at 150 μm, 0.8 wt % TW80 surfactant and 98.2 wt % deionized water was mixed and the suspension was treated in a compression and decompression device. The suspension was pressurized by a plunger pump and passed through a chamber having a 0.18 mm throttle orifice. The suspension was processed under different compression and decompression pressures and a number of runs were carried out. After each run, 50 mL of the sample was left to rest for one week under ambient conditions in order to allow any insoluble particles to settle out and the supernatant liquid was collected for further centrifugation at 1500 rpm for 30 min. After centrifugation, the supernatant was collected, dried at 90-100° C. for 24 hours and the mass concentration of solid was determined. To confirm that the supernatant material is graphene material, Raman spectroscopy was performed. The graphene material can be separated from the liquid medium by known or conventional methods.

TABLE 1

| Compression pressure, PSI | Decompression pressure, PSI | Decompression time, seconds | 1 Pass through orifice. Graphene material yield, % | 5 Passes through orifice. Graphene material yield, % |
| --- | --- | --- | --- | --- |
| 2,000 | 160 | $1.55 \times 10^{-6}$ | 0.11 | 0.38 |
| 5,000 | 410 | $1.0 \times 10^{-6}$ | 0.26 | 0.66 |
| 10,000 | 630 | $0.70 \times 10^{-6}$ | 0.46 | 1.05 |
| 15,000 | 1,100 | $0.57 \times 10^{-6}$ | 0.58 | 1.22 |
| 20,000 | 1,250 | $0.49 \times 10^{-6}$ | 0.69 | 1.38 |
| 24,000 | 1,320 | $0.45 \times 10^{-6}$ | 0.72 | 1.47 |

The graphene material yield by the compression and explosive decompression treatment method using a recirculation mode is estimated as 30-50 wt %, and could potentially be improved by further process optimization. The compression and explosive decompression treatment method, of a mechanical nature, is powerful compared to the traditional low-throughput technologies. The invented compression and explosive decompression treatment method is a facile, low cost, timesaving and laborsaving route, which can be scaled up to mass production of graphene material.

Although the hereinabove described embodiments of the invention constitute the preferred embodiments, it should be understood that modifications can be made thereto without departing from the scope of the invention as set forth in the appended claims.

What is claimed is:

1. A method of producing a graphene material from graphitic material particles, the method comprising the steps of:
 (a) mixing the graphitic material particles in a liquid medium to form a graphite suspension; and
 (b) exposing said graphite suspension to a compression and explosive decompression treatment, the treatment comprising compressing the graphite suspension to a first pressure, directing the compressed graphite suspension at least once through a local constriction into an area of reduced pressure whereby the graphite suspension is decompressed from the first pressure to a second pressure, thereby expanding the graphitic material particles and exfoliating graphene material from the graphitic material particles to produce graphene material dispersed in said liquid medium,
 wherein the graphite suspension is decompressed from the first pressure to the second pressure in less than $2 \times 10^{-6}$ second and wherein the pressure in the area of reduced pressure is maintained above the saturated vapor pressure of the liquid medium sufficient to prevent formation of cavitation bubbles.

2. The method of claim 1, wherein the first pressure is at least 1000 PSI.

3. The method of claim 1, wherein the second pressure is less than 20% of the first pressure.

4. The method of claim 1, wherein the graphene material produced by the method is graphene sheets, graphene plates or a mixture thereof.

5. The method of claim 1, wherein the graphite suspension passes through one or more orifices, nozzles or apertures in the local constriction.

6. The method of claim 1, wherein said liquid medium comprises water, organic solvent, alcohol, acid, a monomer, an oligomer, a resin, or a combination thereof.

7. The method of claim 1, wherein said liquid medium comprises a surfactant.

8. The method of claim 1, wherein said graphitic material particles comprise natural graphite, synthetic graphite, highly oriented pyrolytic graphite, meso-carbon micro-bead, coke, graphitized meso-phase carbon, graphitized soft carbon, carbon or graphite fiber or whisker, carbon or graphitic nano-fiber, exfoliated graphite, expanded graphite, or a combination thereof.

9. The method of claim 1, wherein said liquid medium comprises a monomer or a polymer dissolved or dispersed therein to form a nanocomposite precursor suspension.

10. The method of claim 1, wherein the graphite suspension is exposed to the compression and explosive decompression treatment at least 20 times.

11. The method of claim 1, wherein the graphite suspension is compressed by use of a pressure intensifier or a pump.

12. The method of claim 7, wherein said surfactant is selected from the group consisting of anionic surfactants, nonionic surfactants, cationic surfactants, amphoteric surfactants, silicone surfactants, fluoro-surfactants, polymeric surfactants, sodium hexametaphosphate, sodium lignosulphonate, poly(sodium 4-styrene sulfonate), sodium dodecylsulfate, sodium sulfate, sodium phosphate, sodium sulfonate, and combinations thereof.

13. The method of claim 1, wherein the second pressure is less than 10% of the first pressure.

14. The method of claim 1, wherein the first pressure is at least 10,000 PSI.

\* \* \* \* \*